E. J. BARRETT.
CHUCK.
APPLICATION FILED OCT. 13, 1915.
1,195,901.
Patented Aug. 22, 1916.
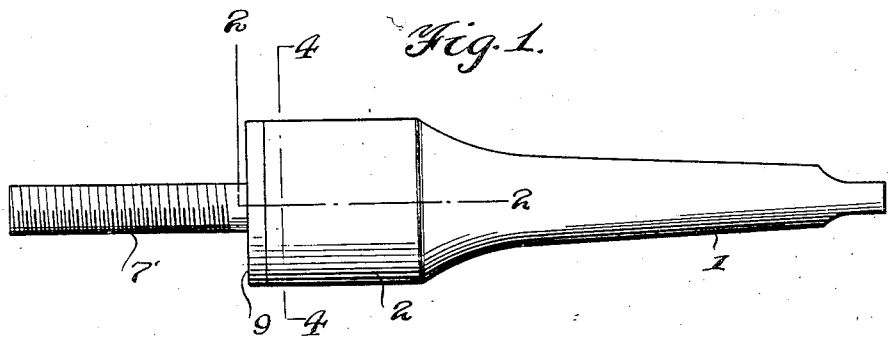
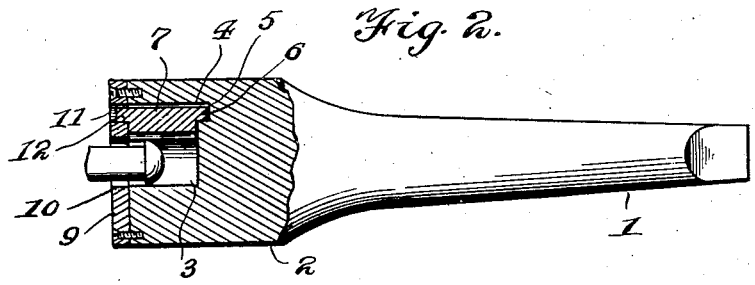
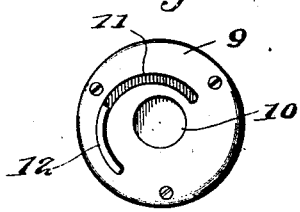
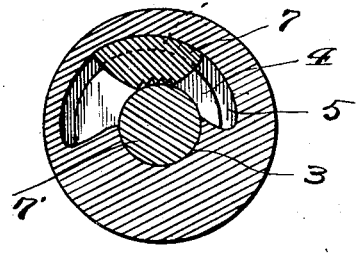
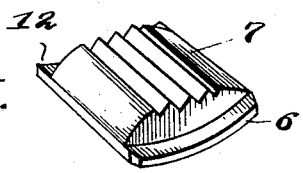
Inventor
E. J. Barrett,
By Victor J. Evans
Attorney
Witnesses

UNITED STATES PATENT OFFICE.

ELIJAH J. BARRETT, OF HOISINGTON, KANSAS.

CHUCK.

1,195,901.   Specification of Letters Patent.   Patented Aug. 22, 1916.

Application filed October 13, 1915. Serial No. 55,703.

*To all whom it may concern:*

Be it known that I, ELIJAH J. BARRETT, a citizen of the United States, residing at Hoisington, in the county of Barton and State of Kansas, have invented new and useful Improvements in Chucks, of which the following is a specification.

The present invention relates to improvements in chucks which are primarily adapted for screwing stay bolts in boiler sheets, and the primary object of the invention is to provide a device of this character which will readily grip either the non-threaded end of a stay bolt and screw the same into the boiler sheets and which, by a slight retrograde movement will release the bolt and permit the chuck being removed from engagement with the said bolt.

Another object of the invention is to provide a device of this character which will embody the desirable features of simplicity in construction, cheapness in manufacture, strength and durability and thorough efficiency in operation.

With the above and other objects in view, the improvement resides in the construction, combination and arrangement of parts set forth in the following specification and falling within the scope of the appended claim.

In the drawing: Figure 1 is a view illustrating the application of my improvement, Fig. 2 is a longitudinal sectional view approximately on the line 2—2 of Fig. 1, Fig. 3 is an end view of the chuck, Fig. 4 is a horizontal sectional view approximately on the line 4—4 of Fig. 1, upon an enlarged scale, and Fig. 5 is a perspective view of the clamping block.

The chuck may be operated by any desired tool which may be actuated either manually or by power, and the said chuck includes a shank 1 adapted to be received in a suitable socket in the operating tool and retained therein in any desired or preferred manner. Formed in the shank 1 is a head 2, the same preferably comprising a cross sectionally annular member and the same is centrally formed with a longitudinally extending cylindrical bore 3. This bore, of course, enters from the outer face of the head and the said head is provided with an eccentrically arranged chamber 4 which communicates with the bore 3 for approximately one-half the diameter of the said bore. The inner wall provided by the passage 4 is formed with a depression 5, corresponding with the shape of the passage, and this depression is adapted to receive the inner reduced flange 6 of the gripping block 7. The block 7 has its inner face provided with teeth and it will be noted that when the same is rotated in the passage in one direction the toothed portion of the block will be projected upon the bore of the head and thus grip the non-threaded end of a stay bolt 7'.

It will be further noted that when the chuck is revolved in an unscrewing direction the gripping block will be moved to the portion of the chamber arranged at one side of the bore and so out of the area of the said bolt, to permit of the removal of the chuck from the bolt.

Preferably I provide the outer end of the head with a removable plate 9, having an opening 10 registering with the bore of the chuck and also an eccentrically arranged slot 11. The outer end of the gripping block is provided with a reduced flange 12 which is received within the depression 11 of the cap or covering plate 9.

From the above description, taken in connection with the accompanying drawing, the simplicity of the device, as well as the advantages thereof will, it is thought, be perfectly apparent to those skilled in the art to which such invention appertains without further detailed description.

It is to be understood that while a toothed block has been illustrated and described as engaging with the chuck, other elements, as for instance, a roller could be employed with equal efficiency.

Having thus described the invention, what I claim is:

The combination with a head having a central cylindrical bore and an eccentrically arranged chamber upon one side and communicating with the bore, the inner wall of the chamber at its curved side being formed with a depression, a removable cap secured to the head and having a central opening registering with the bore and an eccentric opening disposed opposite the mentioned depression in the inner wall of the chamber, and a gripping block having a rounded surface which is adapted to engage with the rounded wall of the chamber and its ends formed with rounded flanges one adapted to be received in the depression of the chamber and the other in the eccentrically arranged opening in the cap plate, and the base of the gripping block arranged adjacent the bore of the head being formed with longitudinally extending teeth.

In testimony whereof I affix my signature in presence of two witnesses.

ELIJAH J. BARRETT.

Witnesses:
J. H. HARTMAN,
N. H. NICHOLAS.